(12) United States Patent
Amiya et al.

(10) Patent No.: US 10,793,703 B2
(45) Date of Patent: Oct. 6, 2020

(54) TIRE

(71) Applicant: BRIDGESTONE CORPORATION, Tokyo (JP)

(72) Inventors: Motoki Amiya, Tokyo (JP); Chiyo Miyamoto, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 50 days.

(21) Appl. No.: 16/214,265

(22) Filed: Dec. 10, 2018

(65) Prior Publication Data

US 2019/0177515 A1    Jun. 13, 2019

(30) Foreign Application Priority Data

Dec. 13, 2017 (JP) .................................. 2017-238976
Jul. 24, 2018 (JP) ................................ 2018-138736

(51) Int. Cl.

| | | |
|---|---|---|
| *C08L 9/00* | (2006.01) | |
| *C08L 7/00* | (2006.01) | |
| *B60C 1/00* | (2006.01) | |
| *C08C 19/22* | (2006.01) | |
| *C08L 15/00* | (2006.01) | |
| *B60C 17/08* | (2006.01) | |

(52) U.S. Cl.
CPC .............. *C08L 9/00* (2013.01); *B60C 1/0025* (2013.01); *C08C 19/22* (2013.01); *C08L 7/00* (2013.01); *C08L 15/00* (2013.01); *B60C 17/08* (2013.01); *B60C 2001/0058* (2013.01)

(58) Field of Classification Search
CPC ... B60C 1/0025; B60C 17/0009; B60C 17/08; B60C 2001/0033; B60C 2001/0058; B60C 2017/0063; B60C 15/0603; C08C 19/22; C08L 7/00; C08L 9/00; C08L 15/00

See application file for complete search history.

(56) References Cited

U.S. PATENT DOCUMENTS

| | | | | |
|---|---|---|---|---|
| 5,552,499 | A * | 9/1996 | Kitamura .................. | B60C 1/00 524/571 |
| 6,025,450 | A * | 2/2000 | Lawson .................... | B60C 1/00 152/209.1 |
| 2012/0152425 | A1* | 6/2012 | Kawashima ........ | B60C 17/0009 152/517 |
| 2015/0045474 | A1* | 2/2015 | Lee .......................... | C08C 19/25 523/155 |
| 2016/0053097 | A1* | 2/2016 | Koda ....................... | C08K 3/36 524/526 |

FOREIGN PATENT DOCUMENTS

JP         2010-155550 A      7/2010

* cited by examiner

*Primary Examiner* — Christopher M Rodd
(74) *Attorney, Agent, or Firm* — Sughrue Mion, PLLC (57) ABSTRACT

The present invention provides a tire which has at least one member selected from the group consisting of a side reinforcing rubber layer and a bead filler made of a vulcanized rubber composition comprising a natural rubber as a rubber component and having a difference between a dynamic tensile storage modulus E' at 180° C. (A) and a dynamic tensile storage modulus E' at 25° C. (B) {E'(A)–E'(B)} of 2.0 MPa or more, the dynamic tensile storage moduli being measured under conditions of an initial tensile strain of 5%, a dynamic tensile strain of 1%, and a frequency of 52 Hz, and provides the tire excellent in achieving both the riding comfort in normal running and the durability in Run-flat running.

19 Claims, 1 Drawing Sheet

TIRE

TECHNICAL FIELD

The present invention relates to a tire having a side reinforcing rubber layer and/or a bead filler made of a vulcanized rubber composition having a higher dynamic tensile storage modulus at high temperature than the dynamic tensile storage modulus at normal temperature.

BACKGROUND OF THE INVENTION

In order to improve the rigidity of the sidewall part of a tire, particularly of a Run-flat tire, a side reinforcing layer made of a rubber composition alone or a composite of a rubber composition, a fiber, and the like, has been conventionally arranged.

For example, in order to secure the Run-flat durability of the Run-flat tire without damage to the rolling resistance in normal running, a tire having a side reinforcing rubber layer and/or a bead filler made of a rubber composition containing a blend of a rubber component, 55 parts by mass or more of carbon black based on 100 parts by mass of the rubber component, a phenol resin, and a methylene donor is disclosed (for example, refer to PTL1).

CITATION LIST

Patent Literature

PTL1: JP 2010-155550 A

SUMMARY OF INVENTION

Technical Problem

As described above, the rigidity of a vulcanized rubber composition has been enhanced conventionally, in order to improve the Run-flat durability. However, Run-flat tires, in which the rigidity of the sidewall part is higher than that of non-Run-flat tires, provide poor riding comfort, and thus, improvement is required.

An object of the present invention is to achieve both the riding comfort in normal running and the durability in Run-flat running of a Run-flat tire.

The present inventor has resulted in finding that the object of the present invention described above can be achieved by allowing a vulcanized rubber composition to have a higher elastic modulus at high temperature than that at normal temperature, having achieved the present invention.

Solution to Problem

[1] A tire having at least one member selected from the group consisting of a side reinforcing rubber layer and a bead filler made of a vulcanized rubber composition containing a natural rubber as a rubber component and having a difference between a dynamic tensile storage modulus E' at 180° C. (A) and a dynamic tensile storage modulus E' at 25° C. (B) {E'(A)−E'(B)} of 2.0 MPa or more, the dynamic tensile storage moduli being measured under conditions of an initial tensile strain of 5%, a dynamic tensile strain of 1%, and a frequency of 52 Hz.

[2] The tire according to [1], wherein the vulcanized rubber composition has a loss tangent tan δ at 25° C. of 0.080 or less, measured under conditions of an initial tensile strain of 5%, a dynamic tensile strain of 1%, and a frequency of 52 Hz.

[3] The tire according to [1] or [2], wherein the rubber component of an unvulcanized rubber composition before vulcanization of the vulcanized rubber composition contains 20% by mass or more of a modified conjugated diene based rubber.

[4] The tire according to any one of [1] to [3], wherein the content of carbon black in the unvulcanized rubber composition before vulcanization of the vulcanized rubber composition is 30 to 100 parts by mass based on 100 parts by mass of the rubber component.

[5] The tire according to any one of [1] to [4], wherein the unvulcanized rubber composition before vulcanization of the vulcanized rubber composition contains 2.6 to 5.5 parts by mass of a thiuram based vulcanization accelerating agent based on 100 parts by mass of the rubber component.

[6] The tire according to [5], wherein the unvulcanized rubber composition before vulcanization of the vulcanized rubber composition contains a vulcanizing agent, and the mass ratio of the thiuram based vulcanization accelerating agent to the content of a sulfur in the vulcanizing agent (the content of the thiuram based vulcanization accelerating agent/the content of the sulfur in the vulcanizing agent) is 0.4 to 1.2.

[7] The tire according to any one of [3] to [6], wherein the modified conjugated diene based rubber is an amine-modified butadiene rubber.

[8] The tire according to [5] or [6], wherein the unvulcanized rubber composition before vulcanization of the vulcanized rubber composition further contains a vulcanization accelerating agent A other than the thiuram based vulcanization accelerating agent and contains 1.0 to 5.0 parts by mass of the vulcanization accelerating agent A based on 100 parts by mass of the rubber component.

[9] The tire according to any one of [4] to [8], wherein the carbon black has a nitrogen adsorption specific surface area of 20 to 90 m$^2$/g.

[10] The tire according to any one of [1] to [9], wherein the unvulcanized rubber composition before vulcanization of the vulcanized rubber composition does not contain a softener or contains 4.0 parts by mass or less of the softener based on 100 parts by mass of the rubber component.

[11] The tire according to any one of [1] to [10], wherein the unvulcanized rubber composition before vulcanization of the vulcanized rubber composition does not contain a thermosetting resin or contains 1.0 part by mass or less of the thermosetting resin based on 100 parts by mass of the rubber component.

Advantageous Effects of Invention

According to the present invention, a Run-flat tire by which both the riding comfort in normal running and the durability in Run-flat running are excellently achieved can be provided by having at least one member selected from the group consisting of a side reinforcing rubber layer and a bead filler made of a vulcanized rubber composition having a higher dynamic tensile storage modulus at high temperature than the dynamic tensile storage modulus at normal temperature.

DETAILED DESCRIPTION OF THE INVENTION

<Tire>

The tire of the present invention is a tire having at least one member selected from the group consisting of a side reinforcing rubber layer and a bead filler made of a vulcanized rubber composition containing a natural rubber as a rubber component and having a difference between a dynamic tensile storage modulus E' at 180° C. (A) and a dynamic tensile storage modulus E' at 25° C. (B) {E'(A)–E'(B)} of 2.0 MPa or more, the dynamic tensile storage moduli being measured under conditions of an initial tensile strain of 5%, a dynamic tensile strain of 1%, and a frequency of 52 Hz.

A higher dynamic tensile storage modulus E' at high temperature (180° C.) (A) can make the durability in Run-flat running more excellent, and a lower dynamic tensile storage modulus E' at normal temperature (25° C.) (B) can make the riding comfort in normal running more preferable.

When the difference between the dynamic tensile storage modulus E' at 180° C. (A) and the dynamic tensile storage modulus E' at 25° C. (B) {E'(A)–E' (B)} is 2.0 MPa or more, the elastic modulus at high temperature (180° C.) becomes higher than the elastic modulus at normal temperature (25° C.), and the riding comfortability, which is greatly influenced by the elastic modulus of the rubber at normal temperature, and the durability in Run-flat running, which is greatly influenced by the elastic modulus of the rubber at high temperature, both can be excellently achieved. In the tire of the present invention, {E'(A)–E'(B)} is preferably 2.0 MPa or more, more preferably 2.5 MPa or more, still more preferably 2.8 MPa or more. That is, a larger {E'(A)–E'(B)} is more preferred, and there is no upper limit particularly. {E'(A)–E'(B)} is only required to be 15 MPa or less and may be 12 MPa or less.

From the viewpoint of highly achieving both the riding comfort in normal running and the durability in Run-flat running, the dynamic tensile storage modulus E' at normal temperature (25° C.) (B) is preferably 10.0 to 16.5 MPa, more preferably 10.5 to 15.5 MPa, still more preferably 11.0 to 14.5 MPa.

The vulcanized rubber composition to be contained in the tire of the present invention preferably has a loss tangent tan δ at 25° C. of 0.080 or less, measured under conditions of an initial tensile strain of 5%, a dynamic tensile strain of 1%, and a frequency of 52 Hz. When the loss tangent tan δ at 25° C. of the vulcanized rubber composition is 0.080 or less, the rolling resistance in normal running can be reduced and the heat generation of the tire can be reduced so that an elevation in the temperature of the reinforcing rubber in the side portion in Run-flat running can be suppressed. From this viewpoint, the loss tangent tan δ at 25° C. of the vulcanized rubber composition is more preferably 0.075 or less, and the loss tangent tan δ at 25° C. is still more preferably 0.060 or less.

Hereinafter, the structure of a Run-flat tire having a side reinforcing rubber layer will be described using FIG. 1, as one example of the tire of the present invention.

Figure 1:
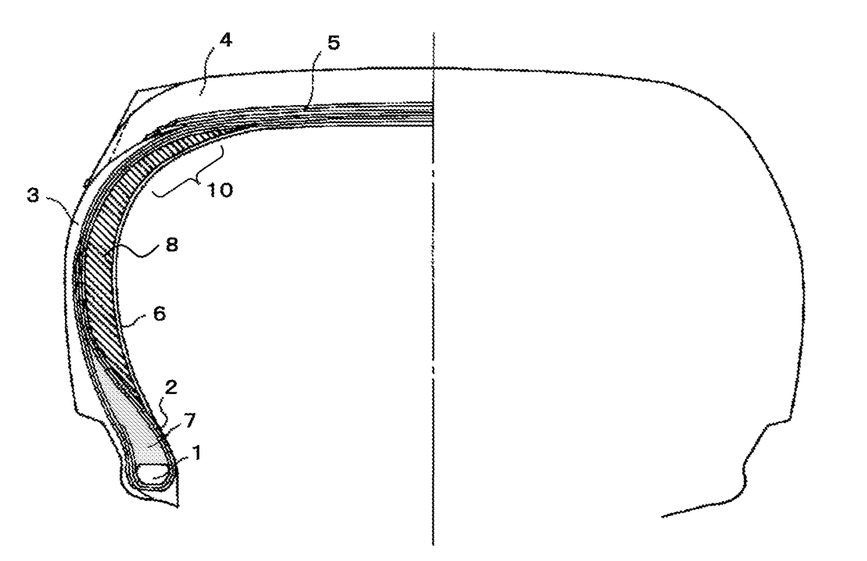
FIG. 1 is a schematic drawing showing a cross section in one embodiment of the tire of the present invention.

FIG. 1 is a schematic drawing showing a cross section in one embodiment of the Run-flat tire according to the present invention, illustrating the arrangement of individual components of the Run-flat tire according to the present invention such as a side reinforcing rubber layer 8.

In FIG. 1, a suited embodiment of the Run-flat tire (sometimes referred to simply as the "tire" hereinafter) of the present invention is a tire provided with a carcass layer 2 which is ranged toroidally over a space between a pair of bead cores 1, 1' (1' is not illustrated) and which comprises at least one radial carcass ply rolling up the above bead core 1 from an inside of the tire to an outside thereof at both end parts, a side rubber layer 3 which is arranged at an outside of a tire axial direction in a side region of the above carcass layer 2 to form an outside part, a tread rubber layer 4 which is arranged at an outside of a tire diameter direction in a crown region of the above carcass layer 2 to form a grounded part, a belt layer 5 which is arranged between the above tread rubber layer 4 and the crown region of the above carcass layer 2 to form a reinforcing belt, an inner liner 6 which is arranged on a whole surface of the carcass layer 2 at an inside of the tire to form an air proof film, a bead filler 7 which is arranged between a main body part of the carcass layer 2 extending from one bead core 1 to the other bead core 1' and a roll-up part rolled up on the above bead core 1, and at least one side reinforcing rubber layer 8 which is arranged between the carcass layer 2 and the inner liner 6 from a bead filler 7 side part to a shoulder zone 10 in a side region of the above carcass layer and in which a cross-sectional form along a rotational axis of the tire is approximately lunate.

The Run-flat tire according to the present invention having at least one member selected from the group consisting of a side reinforcing rubber layer and a bead filler made of the rubber composition according to the present invention has an excellent durable life.

The carcass layer 2 of the tire may comprise at least one carcass ply or two or more carcass plies. The reinforcing cords of the carcass ply may be arranged at a substantially 90° to the circumferential direction of the tire, with an embedded cord count of 35 to 65 pieces/50 mm. Outside the crown region of the carcass 4 in the radial direction of the tire, a belt layer 5 comprising two layers of a first belt layer 5a and a second belt layer 5b is arranged, though the number of layers in the belt layer 5 is not limited thereto. A plurality of steel cords arranged in parallel in the width direction of the tire without twisting together may be embedded in rubber for use as the first belt layer 5a and the second belt layer 5b. For example, the first belt layer 5a and the second belt layer 5b may be arranged to cross each other between layers, so that a crossed belt can be formed.

Outside the belt layer 5 in the radial direction of the tire, a belt reinforcing layer (not shown in drawing) may be further arranged. The reinforcing cord of the belt reinforcing layer is preferably made from a high-modulus organic fiber to secure the tensile rigidity in the circumferential direction of the tire. An organic fiber cord of aromatic polyamide (aramid), polyethylene naphthalate (PEN), polyethylene terephthalate, rayon, Zylon (registered trade mark) (poly-paraphenylene benzobisoxazol (PBO) fiber), or aliphatic polyamide (nylon) may be used as the organic fiber cord.

In the tire, reinforcing components such as an insert and a flipper may be arranged besides the side reinforcing layer, though not shown in the drawing. The insert is a reinforcing material made of a plurality of high-modulus organic fiber cords placed side by side and coated with rubber, so as to be arranged from the bead portion 3 to the side portion 2 in the circumferential direction of the tire (notshown in drawing). The flipper is a reinforcing material made of a plurality of high-modulus organic fiber cords placed side by side and coated with rubber, arranged between a main part of the carcass ply extending between the bead core 1 and 1' and a turnup part around the bead core 1 or 1', involving bead core 1 or 1' and at least a part of the bead filler 7 arranged outside thereof in the radial direction of the tire. The angle of the insert and the flipper is preferably 30 to 60° to the circumferential direction.

The bead cores 1 and 1' are embedded in a pair of bead portions respectively. A carcass layer 2 is turned down around the bead cores 1 and 1' from the inside to the outside of the tire so as to be engaged. The method for engaging the carcass layer 2 is not limited thereto, though. For example, at least one carcass ply of the carcass plies constituting the carcass layer 2, may be turned down around the bead cores 1 and 1' from the inside toward the outside in the tire width direction, so as to form a so-called envelope structure in which the turnup end is positioned between the belt layer 5 and the crown portion of the carcass layer 2. Furthermore, a tread pattern may be appropriately formed on the surface of the tread rubber layer 4, and an inner liner 6 may be formed on the innermost layer. As a filling gas in the tire, such as normal air or air with a partial oxygen pressure changed, or an inert gas such as nitrogen can be used.

(Vulcanized Rubber Composition)

The vulcanized rubber composition to be contained in the tire of the present invention contains a natural rubber as a rubber component. The rubber composition containing a natural rubber can improve the rapture characteristics such as tensile strength and elongation at break.

The rubber component of this vulcanized rubber composition or the rubber component of the unvulcanized rubber composition before vulcanization preferably contains 20% by mass or more of, more preferably 20 to 90% by mass of, still more preferably 20 to 80% by mass of a modified conjugated diene based rubber. When the rubber component contains 20% by mass or more of the modified conjugated diene based rubber, the interaction with carbon black increases, the heat generation of the side reinforcing rubber for Run-flat tire is reduced (i.e., the loss tangent tan δ is suppressed low to improve the low heat generation property), and the durability in Run-flat running is improved.

(Modified Conjugated Diene Based Rubber)

The modified conjugated diene based rubber to be used in the tire of the present invention may be used alone or in combination of two or more kinds thereof.

The rubber component may contain a non-diene based rubber to the extent that the effect of the present invention is not hindered.

The modified conjugated diene based rubber in the rubber component preferably contains a modified butadiene rubber from the viewpoint of further improving the interaction with carbon black and further reducing the heat generation of the side reinforcing rubber for Run-flat tire (further improving the low heat generation property).

The modified butadiene rubber is preferably a modified butadiene rubber having at least one functional group that interacts with carbon black. The functional group that interacts with carbon black is preferably a functional group that has an affinity for carbon black, and is specifically preferably at least one of selected from the group consisting of tin-containing functional groups, silicon-containing functional groups, and nitrogen-containing functional groups.

The modified butadiene rubber according to the present invention has a vinyl bond content in a micro structure of preferably 20 to 50% by mass, more preferably 25 to 50% by mass, from the viewpoint of increasing the elastic modulus at high temperature to thereby improve the Run-flat durability.

In the case where the modified butadiene rubber is a modified butadiene rubber having at least one functional group selected from the group consisting of tin-containing functional groups, silicon-containing functional groups, and nitrogen-containing functional groups, the modified butadiene rubber is preferably a butadiene rubber modified by a modifying agent such as a tin-containing compound, a silicon-containing compound, or a nitrogen-containing compound to have a tin-containing functional group, a silicon containing functional group, a nitrogen-containing functional group, or the like introduced.

In modifying the polymerization active site of the butadiene rubber by a modifying agent, as the modifying agent to be used, a nitrogen-containing compound, a silicon-containing compound, and a tin-containing compound are preferred. In this case, a nitrogen-containing functional group, a silicon-containing functional group, or a tin-containing functional group can be introduced by modification reaction.

Such a functional group for modification may be present at any of the polymerization initiation end, main chain, and the active polymerization end of the polybutadiene.

The nitrogen-containing compound that can be used as the modifying agent described above preferably has a substituted or unsubstituted amino group, an amide group, an imino group, an imidazole group, a nitrile group, or a pyridyl group. Examples of nitrogen-containing compounds preferable as the modifying agent include isocyanate compounds such as diphenylmethane diisocyanate, crude MDI, trimethylhexamethylene diisocyanate, and tolylene diisocyanate, 4-(dimethylamino)benzophenone, 4-(diethylamino)benzophenone, 4-dimethylamino benzylideneaniline, 4-dimethylamino benzylidenebutylamine, dimethyl imidazolidinone, and N-methylpyrrolidone hexamethyleneimine.

Examples of silicon-containing compounds that can be used as the modifying agent described above include 3-glycidoxypropyltrimethoxysilane, 3-glycidoxypropyltriethoxysilane, N-(1-methylpropylidene)-3-(triethoxysilyl)-1-propanamine, N-(1,3-dimethylbutylidene)-3-(triethoxysilyl)-1-propanamine, N-(3-triethoxysilylpropyl)-4,5-dihydroimidazole, 3-methacryloyloxypropyltrimethoxysilane, 3-isocyanatopropyltriethoxysilane, 3-triethoxysilylpropylsuccinic anhydride, 3-(1-hexamethyleneimino)propyl(triethoxy)silane, (1-hexamethyleneimino)methyl(trimethoxy)silane, 3-diethylaminopropyl(triethoxy)silane, 3-dimethylaminopropyl(triethoxy)silane, 2-(trimethoxysilylethyl)pyridine, 2-(triethoxysilylethyl)pyridine, 2-cyanoethyltriethoxysilane, and tetraethoxysilane. These silicon-containing compounds may be used alone or in combination of two or more. Partial condensation products of the silicon-containing compound also may be used.

Furthermore, as the modifying agent described above, a modifying agent represented by the following formula (I) is also preferred:

$$R^1_a Z X_b \qquad (I)$$

wherein $R^1$ is each independently selected from the group consisting of an alkyl group having 1 to 20 carbon atoms, a cycloalkyl group having 3 to 20 carbon atoms, an aryl group having 6 to 20 carbon atoms, and an aralkyl group having 7 to 20 carbon atoms; Z is tin or silicon; X is each independently chlorine or bromine; a is 0 to 3, and b is 1 to 4, provided that a+b=4. The modified butadiene rubber obtained by modification with the modifying agent of the formula (I) has at least one tin-carbon bond or silicon-carbon bond.

Specific examples of $R^1$ of the formula (I) include a methyl group, an ethyl group, a n-butyl group, a neophyl group, a cyclohexyl group, a n-octyl group, and a 2-ethylhexyl group. Specifically, as the modifying agent, SnC14, $R^1SnCl_3$, $R^1{}_2SnCl_2$, $R^1{}_3SnCl$, $SiCl_4$, $R^1SiCl_3$, $R^1{}_2SiCl_2$, $R^1{}_3SiCl$, and the like are preferred, and $SnCl_4$ and $SiCl_4$ are particularly preferred.

As the modified butadiene rubber, among those described above, from the viewpoint of reducing the heat generation of the side reinforcing rubber for Run-flat tire and extending the durable life, a modified butadiene rubber having a nitrogen-containing functional group is preferred, and an amine-modified butadiene rubber is more preferred. That is, from the viewpoint of particularly improving the interaction with carbon black and particularly reducing the heat generation of the side reinforcing rubber for Run-flat tire (particularly improving the low heat generation property), the modified conjugated diene based rubber in the rubber component preferably contains an amine-modified butadiene rubber, more preferably contains only an amine-modified butadiene rubber.

Modifying Group of Amine-Modified Butadiene Rubber)

The amine-modified butadiene rubber preferably includes a primary amino group or a secondary amino group, as an amine functional group for modification. Amine-modified butadiene rubbers having a primary amino group protected with a removable group or a secondary amino group protected with a removable group as an amine functional group for modification introduced are more preferred, and amine-modified butadiene rubbers having a silicon atom-containing functional group further introduced in addition to the amino groups are still more preferred.

Examples of the primary amino group protected with a removable group (also referred to as a protected primary amino group) include a N,N-bis(trimethylsilyl)amino group, and examples of the secondary amino group protected with a removable group include a N,N-(trimethylsilyl)alkylamino group. The N,N-(trimethylsilyl)alkylamino group-containing group may be any of a non-cyclic residue and a cyclic residue.

Among the amine-modified butadiene rubber described above, a primary amine-modified butadiene rubber modified with a protected primary amino group is more suitably used.

Examples of the silicon atom-containing functional group include a hydrocarbyloxy silyl group and/or a silanol group comprising a silicon atom to which a hydrocarbyloxy group and/or a hydroxy group bonded.

Such a functional group for modification has an amino group protected with a removable group and one or more (e.g., one or two) silicon atom(s) to which a hydrocarbyloxy group and a hydroxyl group are bonded, preferably at the polymerization end, more preferably at the same active polymerization end, of the butadiene rubber.

In order to react an active end of the butadiene rubber with protected primary amine to modify it, the above butadiene rubber is preferably provided with a living property or a pseudo-living property in at least 10% of a polymer chain. Polymerization reaction providing the above living property includes reaction in which a conjugate diene compound alone or a conjugate diene compound and an aromatic vinyl compound are subjected to anionic polymerization in an organic solvent using an organic alkali metal compound as an initiator or reaction in which a conjugate diene compound alone or a conjugate diene compound and an aromatic vinyl compound are subjected to coordinate anionic polymerization in an organic solvent by a catalyst containing a lanthanum series rare earth element compound. The former is preferred since it can provide a polymer having a high content of a vinyl bond in a conjugate diene part as compared with that in the latter. The heat resistance can be improved by enhancing the vinyl bond amount.

(Polymerization Initiator)

The organic alkali metal compound used as the initiator for the anionic polymerization is preferably an organic lithium compound. The organic lithium compound shall not specifically be restricted, and hydrocarbyllithium and lithium amide compounds are preferably used. When hydrocarbyllithium of the former is used, a butadiene rubber which has a hydrocarbyl group at a polymerization initiation end and in which the other end is a polymerization active site is obtained. Also, when the lithium amide compound of the latter is used, a butadiene rubber which has a nitrogen-containing group at a polymerization initiation end and in which the other end is a polymerization active site is obtained.

The hydrocarbyllithium described above is preferably a product having a hydrocarbyl group having 2 to 20 carbon atoms, and it includes, for example, ethyllithium, n-propyllithium, isopropyllithium, n-butyllithium, sec-butyllithium, tert-octyllithium, n-decyllithium, phenyllithium, 2-naphthyllithium, 2-butylphenyllithium, 4-phenylbutyllithium, cyclohexyllithium, cyclopentyllithium and reaction products of diisopropenylbenzene and butyllithium. Among them, n-butyllithium is particularly suited.

On the other hand, the lithium amide compound includes, for example, lithium hexamethyleneimide, lithium pyrrolidide, lithium pipericlide, lithium heptamethyleneimide, lithium dodecamethyleneimide, lithium dimethylamide, lithium diethylamide, lithium dibutylamide, lithium dipropylamide, lithium diheptylamide, lithium dihexylamide, lithium dioctylamide, lithium di-2-ethylhexylamide, lithium didecylamide, lithium N-methylpiperazide, lithium ethylpropylamide, lithium ethylbutylamide, lithium ethylbenzylamide, lithium methylphenethylamide and the like. Among them, cyclic lithium amide such as lithium hexamethyleneimide, lithium pyrrolidide, lithium pipericlide, lithium heptamethyleneimide, lithium dodecamethyleneimide and the like are preferred from the viewpoints of an interaction effect to carbon black and a polymerization initiation ability, and lithium hexamethyleneimide and lithium pyrroliclide are particularly suited.

In general, compounds prepared in advance from secondary amines and lithium compounds can be used for the above lithium amide compounds, and they can be prepared as well in the polymerization system (in-Situ). Also, a use amount of the above polymerization initiator is selected preferably in a range of 0.2 to 20 millimole per 100 g of the monomer.

A method for producing the butadiene rubber by the anionic polymerization using the organic lithium compounds described above as the polymerization initiator shall not specifically be restricted, and methods which have so far been publicly known can be used.

To be specific, the conjugate diene compound or the conjugate diene compound and the organic vinyl compound are subjected to anionic polymerization in the organic solvent which is inactive to the reaction, for example, a hydrocarbon based solvent such as aliphatic, alicyclic and aromatic hydrocarbon compounds using the lithium compounds described above as the polymerization initiator under the presence of a randomizer used if desired, whereby the targeted butadiene rubber having an active end is obtained.

Further, when the organic lithium compounds is used as the polymerization initiator, not only the butadiene rubber having an active end but also the copolymer of the conjugate diene compound and the organic vinyl compound which has an active end can efficiently be obtained as compared with a case where the catalyst containing the lanthanum based rear earth element compound described above is used.

The hydrocarbon base solvent described above is preferably hydrocarbons having 3 to 8 carbon atoms, and capable of being listed are, for example, propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, ethylbenzene and the like. They may be used alone or in a mixture of two or more kinds thereof.

A concentration of the monomer in the solvent is preferably 5 to 50% by mass, more preferably 10 to 30% by mass. When the conjugate diene compound and the aromatic vinyl compound are used to copolymerize them, a content of the organic vinyl compound in the charged monomer mixture falls preferably in a range of 55% by mass or less.

(Modifying Agent)

In the present invention, the reaction of the active end of a butadiene rubber having the active end obtained as described above with a protected primary amine compound as a modifier enables manufacturing of a primary amine-modified butadiene rubber, and the reaction with a protected secondary amine compound enables manufacturing of a secondary amine-modified butadiene rubber. As the protected primary amine compound, an alkoxysilane compound having a protected primary amine group is suitably used, and as the protected secondary amine compound, an alkoxysilane compound having a protected secondary amine group is suitably used.

Examples of the alkoxysilane compound having a protected primary amino group to be used as the modifying agent for obtaining the amine-modified butadiene rubber described above preferably include N,N-bis(trimethylsilyl)aminopropylmethyldimethoxysilane, N,N-bis(trimethylsilyl)aminopropylmethyldiethoxysilane, and 1-trimethylsilyl-2,2-dimethoxy-1-aza-2-silacyclopentane.

Examples of the modifying agent for obtaining the amine-modified butadiene rubber described above also include alkoxysilane compounds having a protected secondary amino group; alkoxysilane compounds having an imino group; and alkoxysilane compounds having an amino group.

These modifying agents may be used alone or in a combination of two or more. Also, the above modifying agents may be partial condensation products.

In this connection, the partial condensation products mean the modifying agents in which a part (not all) of SiOR (R is an alkyl group or the like) is converted into a SiOSi bond by condensation.

In modifying reaction carried out by the modifying agent, a use amount of the modifying agent is preferably 0.5 to 200 mmol/kg·butadiene rubber. The above use amount is more preferably 1 to 100 mmol/kg·butadiene rubber, particularly preferably 2 to 50 mmol/kg·butadiene rubber. In this regard, the butadiene rubber means a mass of the butadiene rubber which does not contain additives such as an antioxidant and the like added in the production or after the production. Controlling a use amount of the modifying agent to the ranges described above makes a filler, particularly carbon black excellent in a dispersibility and allows the anti-rapture characteristic and the low heat generation property of the side reinforcing rubber for Run-flat tire to be improved.

An adding method of the modifying agents described above shall not specifically be restricted and includes a method in which they are added in one lot, a method in which they are added in a divided lot, a method in which they are added continuously and the like, and the method in which they are added in one lot is preferred.

Also, the modifying agent can be bonded to any of a principal chain and a side chain of the polymer in addition to a polymerization initiating end and a polymerization finishing end thereof, and it is introduced preferably into the polymerization initiating end or the polymerization finishing end from the viewpoint that energy can be inhibited from disappearing from an end of the polymer to improve the low heat generation property.

(Condensation Accelerator)

In the present invention, a condensation accelerator is preferably used in order to accelerate condensation reaction in which the alkoxysilane compound having a protected primary amino group used as the modifying agent described above participates.

Capable of being used as the above condensation accelerator are compounds having a tertiary amino group or organic compounds having at least one element belonging to any of a 3rd group, a 4th group, a 5th group, a 12th group, a 13th group, a 14th group and a 15th group in the periodic table (long periodic table). Further, the condensation accelerator is preferably alkoxides, carboxylates or acetylacetonate complex salts containing at least one metal selected from the group consisting of titanium (Ti), zirconium (Zr), bismuth (Bi), aluminum (Al) and tin (Sn).

The condensation accelerator used above can be added before the modification reaction described above, but it is preferably added to the modification reaction system in the middle of the modification reaction and/or after finishing it. When it is added before the modification reaction, it is reacted directly with the active end, and the hydrocarbyloxy group having a protected primary amino group is not introduced into the active end in a certain case.

An addition timing of the condensation accelerator is usually after 5 minutes to 5 hours since initiating the modification reaction, preferably after 10 minutes to 1 hour since initiating the modification reaction, more preferably after 15 minutes to 1 hour since initiating the modification reaction.

Specific examples of the condensation accelerator include compounds containing titanium, such as tetrakis(2-ethyl-1,3-hexanediolato)titanium, compounds containing bismuth, compounds containing zirconium, and compounds containing aluminum.

Among the condensation accelerators described above, the titanium compounds are preferred, and the alkoxides of titanium metal, the carboxylates of titanium metal or the acetylacetonate complex salts of titanium metal are particularly preferred.

A use amount of the above condensation accelerators is preferably 0.1 to 10, particularly preferably 0.5 to 5 in terms of a mole ratio of a mole number of the compounds described above to a whole mole number of the hydrocarbyloxy groups present in the reaction system. The condensation reaction is efficiently promoted by controlling a use amount of the condensation accelerators to the ranges described above.

The condensation reaction time is usually 5 minutes to 10 hours, preferably 10 to 5 hours, more preferably 15 to 5 hours. Controlling the condensation reaction time to the ranges described above makes it possible to complete smoothly the condensation reaction.

Also, a pressure of the reaction system in the condensation reaction is usually 0.01 to 20 MPa, preferably 0.05 to 10 MPa.

The content of the modified rubber in the rubber component is preferably 10 to 90% by mass, more preferably 20 to 80% by mass.

[Filler]

The filler contained in the rubber composition according to the present invention preferably contains carbon black. The filler may be carbon black alone, or may contain a reinforcing inorganic filler such as silica and clay in addition to carbon black. The filler contains preferably 50% by mass or more of, more preferably 70% by mass or more of, still more preferably 80% by mass or more of, particularly preferably 90% by mass or more of carbon black.

The carbon black in the filler contained in the rubber composition according to the present invention has a nitrogen adsorption specific surface area of preferably 20 to 90 $m^2/g$, more preferably 20 to 80 $m^2/g$, still more preferably 20 to 60 $m^2/g$. When the nitrogen adsorption specific surface area of the carbon black is within this range, the side reinforcing rubber for Run-flat tire has an excellent balance between the reinforcing ability and the low heat generation property. The nitrogen adsorption specific surface area is measured in compliance with JIS K 6217-2:2001.

A dibutyl phthalate oil absorption of the carbon black described above of 110 mL/100 g or more is preferred because the rigidity of the side reinforcing rubber for Run-flat tire is improved. The dibutyl phthalate oil absorption is usually 160 mL/100 g or less, and the higher the better.

The dibutyl phthalate oil absorption is measured in compliance with JIS K 6217-4:2008.

Carbon black having properties other than those described above may be further contained, as required.

The high-structure carbon black having a large particle size as described above may be used for damping rubber materials such as anti-vibration rubber and seismic isolation rubber. Such anti-vibration rubber is flexible rubber that prevents vibration in the automotive engine from being transmitted to the interior of a vehicle. In contrast, the vulcanized rubber of the present invention is a rubber having a high elastic modulus, i.e., a tensile elastic modulus at 25% elongation at 100° C. of 1.2 MPa or more. In the case where the vulcanized rubber of the present invention is used in the side reinforcing rubber of a Run-flat tire, for example, the side reinforcing rubber is a reinforcing component that supports a running vehicle under high compressive force conditions and even under high temperature conditions, and thus, its operating environment and purpose are significantly different from those of damping rubber materials. Although anti-vibration rubber also may be recognized to be a component to support the engine load, the side reinforcing rubber is subjected to a short-term input under strict conditions imposed by a passenger car running at a high speed. In contrast, the anti-vibration rubber is subjected to a long-term input under relatively mild conditions imposed by the engine. Both inputs are completely different from each other.

The content of the carbon black in the vulcanized rubber composition according to the present invention or in the rubber composition of unvulcanized rubber composition before vulcanization of the vulcanized rubber composition is, from the viewpoint of achieving both the low heat generation property and the reinforcing ability of the side reinforcing rubber for Run-flat tire, which is a primary application of the rubber composition according to the present invention, preferably 30 to 100 parts by mass, more preferably 30 to 70 parts by mass, still more preferably 40 to 65 parts by mass, particularly preferably 40 to 60 parts by mass based on 100 parts by mass of the rubber component.

With a content of the carbon black of 100 parts by mass or less, the loss tangent tan δ is suppressed low to improve the low heat generation property. With 30 parts by mass or more, the durability in Run-flat running is improved.

[Vulcanizing Agent]

The unvulcanized rubber composition before vulcanization of the vulcanized rubber composition according to the present invention contains a vulcanizing agent. As the vulcanizing agent, sulfur is usually used. The content of the vulcanizing agent, in terms of a sulfur content, is preferably 3.0 to 6.0 parts by mass, more preferably 3.0 to 5.5 parts by mass, still more preferably 3.5 to 5.5 parts by mass based on 100 parts by mass of the rubber component. As the vulcanizing agent, sulfur is preferred. Examples of vulcanizing agents other than sulfur include morpholine and disulfide.

[Vulcanization Accelerating Agent]

The unvulcanized rubber composition before vulcanization of the vulcanized rubber composition according to the present invention preferably contains a vulcanization accelerating agent in order to accelerate vulcanization of the rubber component. It is preferred that the vulcanized rubber composition have a higher monosulfide ratio and a polysulfide ratio of 30% or less, from the viewpoint of improving the durability. From this viewpoint, the vulcanization accelerating agent according to the present invention preferably contains a thiuram based vulcanization accelerating agent.

The thiuram based vulcanization accelerating agent has preferably 4 or more side-chain carbon atoms, more preferably 6 or more side-chain carbon atoms, still more preferably 8 or more side-chain carbon atoms. With 4 or more side-chain carbon atoms, the thiuram based vulcanization accelerating agent is excellently dispersed in the rubber composition, and a uniform crosslinked network is likely to be formed.

Examples of the thiuram based vulcanization accelerating agent having 4 or more side-chain carbon atoms include tetrakis(2-ethylhexyl)thiuram disulfide, tetrakis(n-dodecyl) thiuram disulfide, tetrakis(benzyl)thiuram disulfide, tetrabutylthiuram disulfide, clipentamethylenethiuram tetrasulfide, and tetrabenzylthiuram disulfide, and among these, tetrakis (2-ethylhexyl)thiuram disulfide is preferred.

The vulcanization accelerating agent contained in the unvulcanized rubber composition before vulcanization of the vulcanized rubber composition according to the present invention contains a thiuram based vulcanization accelerating agent, and the mass ratio of the thiuram based vulcanization accelerating agent to the content of a sulfur in the vulcanizing agent to be used for the unvulcanized rubber composition (the content of the thiuram based vulcanization accelerating agent/the content of the sulfur in the vulcanizing agent) is preferably 0.4 to 1.2, more preferably 0.5 to 1.1, still more preferably 0.6 to 1.1.

Since the vulcanization accelerating agent has a polarity higher than that of the rubber component, the vulcanization accelerating agent may be deposited from the surface of the rubber component (a bloom phenomenon). Although addition of a large amount of the vulcanization accelerating agent is required in order for the vulcanized rubber to have a predetermined elastic modulus, setting the mass ratio (the content of the thiuram based vulcanization accelerating agent/the content of the sulfur in the vulcanizing agent) to 0.4 to 1.2 can suppress the bloom phenomenon to thereby reduce defective adhesion in processing of the unvulcanized rubber composition, appearance defects of the final product, and the like.

It is essential to contain 2.6 to 5.5 parts by mass of the thiuram based vulcanization accelerating agent in the rubber composition based on 100 parts by mass of the rubber component in order to preferably achieve both the riding comfort in normal running and the durability in Run-flat running of the Run-flat tire, and 3.0 to 5.5 parts by mass of the vulcanization accelerating agent is preferably contained, and 3.5 to 5.5 parts by mass of the vulcanization accelerating agent is more preferably contained. With 2.6 parts by mass or more of the thiuram based vulcanization accelerating agent, the durability in Run-flat running becomes good, and with 5.5 parts by mass or less, the riding comfort becomes good.

To achieve desired vulcanization torque and a desired vulcanization rate, a vulcanization accelerating agent A other than the thiuram based vulcanization accelerating agent, a vulcanization retardant, and the like may be used in combination.

In the unvulcanized rubber composition, when 2.6 to 5.5 parts by mass of the thiuram based vulcanization accelerating agent is contained and 1.0 to 5.0 parts by mass, preferably 1.0 to 4.0 parts by mass, more preferably 1.0 to 3.5 parts by mass of the vulcanization accelerating agent A other than the thiuram based vulcanization accelerating agent is contained, based on 100 parts by mass of the rubber component, the elastic modulus of the rubber composition after vulcanization at high temperature (e.g., 180° C.) can be higher and, when the composition is applied to the side reinforcing rubber of the tire, a deflection of the tire sidewall can be suppressed.

Examples of the vulcanization accelerating agent A include sulfenamide based vulcanization accelerating agents, thiazole based vulcanization accelerating agents, dithiocarbamate based vulcanization accelerating agents, xanthate based vulcanization accelerating agents, guanidine based vulcanization accelerating agents, and thiourea based vulcanization accelerating agents. Among these, sulfenamide based vulcanization accelerating agents are preferred. Examples of the sulfenamide based vulcanization accelerating agent include N-(tert-butyl)-2-benzothiazolyl sulfenamide, N-(tert-butyl)-di(benzothiazole)sulfenamide, N-oxydiethylene-2-benzothiazolyl sulfenamide, N-cyclohexyl-2-benzothiazolyl sulfenamide, and N,N-dicyclohexyl-2-benzothiazolyl sulfenamide. One or more vulcanization accelerating agents A are used.

In the unvulcanized rubber composition, the amount of the vulcanization accelerating agent A other than the thiuram based vulcanization accelerating agent contained is preferably smaller than that of the thiuram based vulcanization accelerating agent.

In the unvulcanized rubber composition, {E'(A)−E'(B)} aforementioned can be increased by setting the content of the thiuram based vulcanization accelerating agent to 2.6 parts by mass or more, the content of the vulcanization accelerating agent other than the thiuram based vulcanization accelerating agent to 1.0 part by mass or more, and the sulfur content of the sulfur-containing vulcanizing agent to 3 parts by mass or more.

The rubber composition according to the present invention has a Mooney viscosity ($ML_{1+4}$, 130° C.) of preferably 40 to 100, more preferably 50 to 90, still more preferably 60 to 85. With a Mooney viscosity within the range described above, the physical properties of the side reinforcing rubber for Run-flat tire such as the anti-rapture characteristic can be sufficiently achieved without hindering the production workability.

(Softener)

The unvulcanized rubber composition before vulcanization of the rubber composition according to the present invention preferably contains no softener or 4.0 parts by mass or less of a softener based on 100 parts by mass of the rubber component. The unvulcanized rubber composition contains more preferably 3.0 parts by mass or less of the softener, still more preferably 1.0 part by mass or less of the softener based on 100 parts by mass of the rubber component, and particularly preferably contains no softener.

In the unvulcanized rubber composition before vulcanization of the rubber composition according to the present invention, a softener may be used as required in order to enhance (improve) the flexibility of the side reinforcing rubber after vulcanization and improve the riding comfort. In this case, the unvulcanized rubber composition before vulcanization of the rubber composition preferably contains 0.01 parts by mass or more of the softener.

Containing a lower content of the softener or no softener can increase the ratio of the elastic modulus at high temperature (e.g., 180° C.) to the elastic modulus at room temperature in the rubber composition after vulcanization and, when the rubber composition is applied to the side reinforcing rubber of the tire, a deflection of the tire sidewall can be suppressed. From the viewpoint of improving this durability in Run-flat running, no softener is preferably contained.

The softener according to the present invention preferably includes one or more selected from the group consisting of thermoplastic resins and oils.

The thermoplastic resin is only required to be softened or liquefied at high temperature to improve the flexibility of the side reinforcing rubber to thereby improve the riding comfort. Examples thereof to be used include tackifiers (including no curing agent), such as various petroleum based resins such as C5 based (including cyclopentadiene based resins and dicyclopentadiene based resins), C9 based, and mixed C5/C9 based resins, terpene based resins, terpene-aromatic compound based resins, rosin based resins, phenol resins, and alkyl phenol resins.

The oil refers to a softener that is liquid at normal temperature, and examples thereof include various process oils, such as paraffin based oils, naphthene based oils, and aromatic based oils.

(Thermosetting Resin)

The unvulcanized rubber composition before vulcanization of the rubber composition according to the present invention preferably contains no thermosetting resin or 1.0 part by mass or less of a thermosetting resin based on 100 parts by mass of the rubber component. The rubber composition contains more preferably 0.5 parts by mass or less of the thermosetting resin, still more preferably no thermosetting resin.

The rubber composition according to the present invention becomes more flexible as the content of the thermosetting resin is reduced. Then, a Run-flat tire containing the rubber composition according to the present invention will have a smaller static longitudinal spring constant, and thus the riding comfortability of the Run-flat tire becomes better.

When containing a thermosetting resin as required, the rubber composition contains preferably 0.01 parts by mass or more of the thermosetting resin based on 100 parts by mass of the rubber component.

Examples of the thermosetting resin include resins such as phenol resins, melamine resins, urea resins, and epoxy resins. Examples of the curing agent for phenol resins include hexamethylenetetramines.

The rubber composition according to the present invention may contain blending agents, which are blended and used in usual rubber compositions, in addition to the components described above. Examples of the blending agents include various blending agents to be commonly blended, such as various fillers other than carbon black and silica (e.g., talc and calcium carbonate), a silane coupling agent, a vulcanization accelerating agent, a vulcanization retardant, zinc oxide, stearic acid, wax, an antioxidant, a compatibilizer, a workability improver, a slip agent (lubricant), an ultraviolet absorber, a dispersant, and a homogenizing agent.

As the antioxidant, known antioxidants can be used, though not specifically limited. Examples thereof include phenolic antioxidants, imidazole based antioxidants, and amine based antioxidants. The amount of these antioxidants blended is usually 0.5 to 10 parts by mass, preferably 1 to 5 parts by mass based on 100 parts by mass of the rubber component described above.

When the rubber composition is obtained, a method of blending the components described above shall not specifically be restricted, all the component raw materials may be sequentially blended and kneaded in one stage in an open roll. However, kneading in a plurality of kneading stages is preferred, including a final kneading stage of blending the vulcanizing agent and the vulcanization accelerating agent after a master batch kneading stage of kneading raw materials other than the vulcanizing agent and the vulcanization accelerating agent. In kneading, kneaders such as rolls, internal mixers, and Banbury rotors may be used. Furthermore, in molding the composition into a sheet form or band form, known molding apparatuses may be used, such as extruders and presses.

(Manufacturing of Tire)

The tire, specifically Run-flat tire, according to the present invention is manufactured by a conventional method for manufacturing a Run-flat tire having at least one member selected from the group consisting of a side reinforcing rubber layer 8 and a bead filler 7 made of the rubber composition according to the present invention.

That is, the rubber composition prepared by adding various blending agents is processed into the respective members in a non-vulcanization stage, and the members are stuck and molded on a tire molding equipment by a conventional method, whereby a green tire is molded. This green tire is heated and pressurized in a vulcanizing equipment to obtain a Run-flat tire.

EXAMPLES

Examples 1, 3, 4 and 7 and Comparative Examples 1 and 3

[Preparation of Rubber Composition]

Components were kneaded according to blend compositions shown in the following Table 1, and six types of the rubber compositions of Examples 1, 3, 4 and 7 and Comparative Examples 1 and 3 were prepared.

The modified butadiene rubber used for preparation of the rubber composition was produced by the following method.

[Production of Primary Amine-Modified Butadiene Rubber P]

(1) Manufacturing of Unmodified Polybutadiene

A 5 L autoclave substituted with nitrogen was charged with 1.4 kg of cyclohexane, 250 g of 1,3-butadiene and 2,2-ditetrahydrofurylpropane (0.285 mmol) in the form of a cyclohexane solution under nitrogen flow, and after 2.85 mmol of n-butyllithium (BuLi) was added thereto, polymerization was carried out for 4.5 hours in a warm water bath of 50° C. equipped with a stirring device. A reaction conversion rate of 1,3-butadiene was almost 100%. A part of the above polymer solution was put in a methanol solution containing 1.3 g of 2,6-di-tert-butyl-p-cresol to terminate the polymerization, and then the solvent was removed by steam stripping. The resulting solid matter was dried on a roll of 110° C. to obtain polybutadiene before modification. The polybutadiene before modification thus obtained was used to measure a micro structure (vinyl bonding amount) and, as a result, a vinyl bonding amount was 30% by mass.

(2) Production of Primary Amine-Modified Butadiene Rubber P

The polymer solution obtained in (1) described above was maintained at a temperature of 50° C. without deactivating the polymerization catalyst, and 1129 mg (3.364 mmol) of N,N-bis(trimethylsilyl)aminopropylmethyldiethoxysilane in which a primary amino group was protected was added thereto to carry out modification reaction for 15 minutes.

Thereafter, 8.11 g of tetrakis(2-ethyl-1,3-hexanediolato) titanium as a condensation accelerator was added, and the mixture was further stirred for 15 minutes.

Lastly, to the polymer solution after the reaction, 242 mg of silicon tetrachloride as a metal halogen compound was added, and 2,6-di-tert-butyl-p-cresol was added. Then, desolvent and deprotection of the protected primary amino group were carried out by steam stripping, and the rubber was dried by a hot roll which was controlled at a temperature of 110° C. to obtain a primary amine-modified butadiene rubber P.

The primary amine-modified butadiene rubber P thus obtained was used to measure a micro structure (vinyl bonding amount) and, as a result, the vinyl bonding amount was 30% by mass.

[Manufacturing of Run-Flat Tire]

Subsequently, using the side reinforcing rubber layer 8 and the bead filler 7 shown in FIG. 1 made of the six types of rubber compositions obtained, passenger car radial Run-flat tires having a tire size of 255/65R18 were each manufactured by the conventional method. The maximum thickness of the side reinforcing rubber layer of each sample tire for test was set at 14.0 mm, and all the side reinforcing rubber layers had the same shape. Also, all the bead fillers had the same shape. The dynamic tensile storage modulus E', loss tangent tan δ, and riding comfortability and Run-flat durability of each of the sample tires for test were evaluated by the following methods. The results are shown in Table 1.

[Measurement Method of Dynamic Tensile Storage Modulus E' and Loss Tangent Tan δ]

A specimen obtained by making a slab sheet having a thickness of 2 mm each from the side reinforcing rubber layer (in the circumferential direction at the central thickest part) and the bead filler (in the circumferential direction at the central part 10 mm away from the bead core) of each of the sample tires (radial tires having a tire size of 255/65R18) was subjected to measurement of the dynamic tensile storage modulus E' at a measurement temperature of 180° C., the dynamic tensile storage modulus E' at a measurement temperature of 25° C., and the loss tangent tan δ at a measurement temperature of 25° C. under conditions of an initial tensile strain of 5%, a dynamic tensile strain of 1%, and a frequency of 52 Hz, using a viscoelasticity analyzer VR-7110 manufactured by Ueshima Seisakusho Co., Ltd. In Table 1, data of the side reinforcing rubber layers were listed.

[Riding Comfortability Evaluation]

The riding comfortability of the Run-flat tires was evaluated by the following method.

For the riding comfortability, seven types of tires having a tire size of 255/65R18 (the maximum thickness of the side reinforcing rubber layer was 14.0 mm in all the tires) were used, and the static longitudinal spring constant of each of the sample tires was indexed with a score of 100 representing the magnitude of the static longitudinal spring constant of the tire of Comparative Example 1. The static longitudinal spring constant herein refers to a static longitudinal load necessary to provide the tire with a longitudinal deflection of 1 mm. With a smaller static longitudinal spring constant, the tire is likely to absorb impact from the road surface to provide good riding comfort.

Riding comfortability index=[(static longitudinal spring constant of each sample tire)/(static longitudinal spring constant of the sample tire of Comparative Example 1)]×100

A smaller index value indicates that the tire has excellent riding comfort performance.

[Run-Flat Durability]

The sample tires (radial tires having a tire size of 255/65R18) were each subjected to drum run (speed: 80 km/h) in an inner pressure unfilled state, and the running distance on the drum until the tire became incapable of running was taken as a Run-flat distance. The Run-flat durability was indexed with a score of 100 representing the Run-flat running distance of the Run-flat tire of Comparative Example 1. The larger the index, the better the durable life performance of the Run-flat tire.

Run-flat durability index={(Run-flat running distance of each sample tire)/(Run-flat running distance of the sample tire of Comparative Example 1)}×100

Examples 2, 5, 6 and 8 and Comparative Examples 2 and 4

[Preparation of Rubber Compositions]

Components are kneaded according to blend compositions shown in the following Table 1, and six types of rubber compositions of Examples 2, 5, 6 and 8 and Comparative Examples 2 and 4 are prepared.

The primary amine-modified butadiene rubber P as described above is used for the rubber compositions of Examples 2, 5, 6 and 8 and Comparative Examples 2 and 4.

[Manufacturing of Run-Flat Tire and Evaluation Thereof]

Subsequently, using the side reinforcing rubber layer 8 and the bead filler 7 shown in FIG. 1 made of the six types of the rubber compositions of Examples 2, 5, 6 and 8 and Comparative Examples 2 and 4, passenger car radial Run-flat tires having a tire size of 255/65R18 are each manufactured by the conventional method. The maximum thickness of the side reinforcing rubber layer of each sample tire for test is set at 14.0 mm, and all the side reinforcing rubber layers have the same shape. Also, all the bead fillers have the same shape. The dynamic tensile storage modulus E', loss tangent tan δ, and riding comfortability and Run-flat durability of each of the sample tires for test are evaluated by the methods as described above. The results are shown in Table 1.

Riding comfortability index=[(static longitudinal spring constant of each sample tire)/(static longitudinal spring constant of the sample tire of Comparative Example 1)]×100

A smaller index value indicates that the tire has excellent riding comfort performance.

Run-flat durability index={(Run-flat running distance of each sample tire)/(Run-flat running distance of the sample tire of Comparative Example 1)}×100

The larger the index, the better the durable life performance of the Run-flat tire.

TABLE 1

| | Unit of blend composition: Parts by mass | Example 1 | Example 2 | Example 3 | Example 4 | Example 5 | Example 6 |
|---|---|---|---|---|---|---|---|
| Blend composition of rubber composition | Natural rubber *1 | 30.0 | 30.0 | 30.0 | 40.0 | 30.0 | 50.0 |
| | Primary amine-modified butadiene rubber P *2 | 70.0 | 70.0 | 70.0 | 60.0 | 70.0 | 50.0 |
| | Carbon black 1: FEF *3 | 55.0 | 55.0 | 60.0 | 55.0 | 0.0 | 0.0 |
| | Carbon black 2 *4 | 0.0 | 0.0 | 0.0 | 0.0 | 60.0 | 55.0 |
| | Thermoplastic resin *5 | 0.0 | 0.0 | 0.0 | 0.0 | 0.0 | 0.0 |
| | Thermosetting resin *6 | 0.0 | 0.0 | 0.0 | 0.0 | 0.0 | 0.0 |
| | Curing agent *7 | 0.0 | 0.0 | 0.0 | 0.0 | 0.0 | 0.0 |
| | Stearic acid *8 | 1.0 | 1.0 | 1.0 | 1.0 | 1.0 | 1.0 |
| | Zinc oxide *9 | 5.0 | 5.0 | 5.0 | 5.0 | 5.0 | 5.0 |
| | Antioxidant *10 | 2.0 | 2.0 | 2.0 | 2.0 | 2.0 | 2.0 |
| | Thiuram based vulcanization accelerating agent TOT *11 | 4.0 | 5.0 | 4.0 | 4.0 | 4.0 | 4.0 |

TABLE 1-continued

| | | | | | | | |
|---|---|---|---|---|---|---|---|
| | Sulfenamide based vulcanization accelerating agent NS *12 | 3.0 | 3.0 | 3.0 | 3.0 | 3.0 | 3.0 |
| | Sulfur *13 | 4.0 | 5.0 | 4.0 | 4.0 | 4.0 | 4.0 |
| | Thiuram based accelerating agent/Sulfur | 1.00 | 1.00 | 1.00 | 1.00 | 1.00 | 1.00 |
| Physical properties of vulcanized rubber | Dynamic tensile storage modulus E' at 180° C. (A) (Unit: MPa) | 15.1 | 16.2 | 15.9 | 14.7 | 15.4 | 14.6 |
| | Dynamic tensile storage modulus E' at 25° C. (B) (Unit: MPa) | 12.8 | 13.3 | 13.5 | 12.6 | 13.3 | 11.7 |
| | {E' (A) − E' (B)} | 2.3 | 2.9 | 2.4 | 2.1 | 2.1 | 2.9 |
| | Loss tangent tan δ at 25° C. | 0.073 | 0.066 | 0.077 | 0.075 | 0.058 | 0.061 |
| | Riding comfortability index | 97 | 98 | 98 | 97 | 98 | 95 |
| | Run flat durability index | 109 | 187 | 161 | 102 | 235 | 137 |

| | | Example | | Comparative Example | | | |
|---|---|---|---|---|---|---|---|
| Unit of blend composition: Parts by mass | | 7 | 8 | 1 | 2 | 3 | 4 |
| Blend composition of rubber composition | Natural rubber *1 | 50.0 | 60.0 | 30.0 | 30.0 | 30.0 | 30.0 |
| | Primary amine-modified butadiene rubber P *2 | 50.0 | 40.0 | 70.0 | 70.0 | 70.0 | 70.0 |
| | Carbon black 1: FEF *3 | 0.0 | 0.0 | 60.0 | 55.0 | 65.0 | 60.0 |
| | Carbon black 2 *4 | 60.0 | 60.0 | 0.0 | 0.0 | 0.0 | 0.0 |
| | Thermoplastic resin *5 | 0.0 | 0.0 | 2.0 | 2.0 | 2.0 | 0.0 |
| | Thermosetting resin *6 | 0.0 | 0.0 | 0.0 | 0.0 | 0.0 | 2.0 |
| | Curing agent *7 | 0.0 | 0.0 | 0.0 | 0.0 | 0.0 | 0.2 |
| | Stearic acid *8 | 1.0 | 1.0 | 1.0 | 1.0 | 1.0 | 1.0 |
| | Zinc oxide *9 | 5.0 | 5.0 | 5.0 | 5.0 | 5.0 | 5.0 |
| | Antioxidant *10 | 2.0 | 2.0 | 2.0 | 2.0 | 2.0 | 2.0 |
| | Thiuram based vulcanization accelerating agent TOT *11 | 4.0 | 4.0 | 1.0 | 1.0 | 1.0 | 1.0 |
| | Sulfenamide based vulcanization accelerating agent NS *12 | 3.0 | 3.0 | 3.0 | 3.0 | 3.0 | 3.0 |
| | Sulfur *13 | 4.0 | 4.0 | 4.5 | 4.5 | 4.5 | 4.5 |
| | Thiuram based accelerating agent/Sulfur | 1.00 | 1.00 | 0.22 | 0.22 | 0.22 | 0.22 |
| Physical properties of vulcanized rubber | Dynamic tensile storage modulus E' at 180° C. (A) (Unit: MPa) | 15.9 | 15.9 | 14.1 | 13.4 | 15.2 | 15.1 |
| | Dynamic tensile storage modulus E' at 25° C. (B) (Unit: MPa) | 12.4 | 12.9 | 15.0 | 14.1 | 15.9 | 16.0 |
| | {E' (A) − E' (B)} | 3.5 | 3.0 | −0.9 | −0.7 | −0.7 | −0.9 |
| | Loss tangent tan δ at 25° C. | 0.063 | 0.077 | 0.080 | 0.069 | 0.093 | 0.066 |
| | Riding comfortability index | 96 | 97 | 100 | 98 | 102 | 102 |
| | Run flat durability index | 200 | 185 | 100 | 76 | 119 | 100 |

The details of the components in Table 1 are as follows.
*1 Natural rubber (NR): RSS #1
*2 Primary amine-modified butadiene rubber P: a modified butadiene rubber obtained in Production of primary amine-modified butadiene rubber P described above
*3 Carbon black 1 FEF: N550, manufactured by Asahi Carbon Co., Ltd., "ASAHI #60" [nitrogen adsorption specific surface area: 40 m$^2$/g, DBP oil absorption: 114 ml/100 g]
*4 Carbon black 2 manufactured by Asahi Carbon Co., Ltd., "ASAHI #52" [nitrogen adsorption specific surface area: 28 m$^2$/g, DBP oil absorption: 128 ml/100 g]
*5 Thermoplastic resin: DCPD resin: dicyclopentadiene based petroleum resin, manufactured by Zeon Corporation, "Quintone 1105"
*6 Thermosetting resin: Phenol resin: manufactured by SUMITOMO BAKELITE CO., LTD. "SUMILITE RESIN PR-50731"
*7 Curing agent: Hexamethylenetetramine, manufactured by FUJIFILM Wako Pure Chemical Corporation
*8 Stearic acid: manufactured by New Japan Chemical Co., Ltd., "Stearic acid 50S"
*9 Zinc oxide: manufactured by HakusuiTech Co., Ltd., "Zinc oxide #3"
*10 Antioxidant (6C): N-phenyl-N'-(1,3-dimethylbutyl)-p-phenylenediamine, manufactured by Ouchi Shinko Chemical Industrial Co., Ltd., "NOCRAC 6C"
*11 Thiuram based vulcanization accelerating agent TOT: tetrakis(2-ethylhexyl)thiuram disulfide, manufactured by Ouchi Shinko Chemical Industrial Co., Ltd., "NOCCELER TOT-N"
*12 Sulfenamide based vulcanization accelerating agent NS: N-(tert-butyl)-2-benzothiazolyl sulfenamide, manufactured by Sanshin Chemical Industry Co., Ltd., trade name: "SANCELER NS-G"
*13 Sulfur: manufactured by Tsurumi Chemical Industry Co., Ltd., "Powder sulfur"

From Table 1, it can be seen that the Run-flat tires of Examples 1, 3, 4 and 7 have excellent low heat generation property and have excellently achieved both the riding comfort in normal running and the durability in Run-flat running in comparison with the Run-flat tires of Comparative Examples 1 and 3.

Further, from Table 1, it can be seen that the Run-flat tires of Examples 2, 5, 6 and 8 have excellent low heat generation property and excellently achieve both the riding comfort in normal running and the durability in Run-flat running in comparison with the Run-flat tires of Comparative Examples 2 and 4.

INDUSTRIAL APPLICABILITY

The tire of the present invention, which has excellent low heat generation property and durable life and may excellently achieve both the riding comfort in normal running and the durability in Run-flat running, is suitably used as a Run-flat tire.

REFERENCE SIGNS LIST

1 Bead core
2 Carcass layer
3 Side rubber layer
4 Tread rubber layer
5 Belt layer
6 Inner liner
7 Bead filler
8 Side reinforcing rubber layer
10 Shoulder zone

The invention claimed is:
1. A tire having at least one member selected from the group consisting of a side reinforcing rubber layer and a bead filler made of a vulcanized rubber composition comprising a natural rubber and an amine-modified butadiene rubber having a vinyl bond content in a micro structure of 20 to 50% by mass as a rubber component and having a difference between a dynamic tensile storage modulus E' at 180° C. (A) and a dynamic tensile storage modulus E' at 25°

C. (B) {E'(A)–E'(B)} of 2.0 MPa or more, the dynamic tensile storage moduli being measured under conditions of an initial tensile strain of 5%, a dynamic tensile strain of 1%, and a frequency of 52 Hz.

2. The tire according to claim 1, wherein the vulcanized rubber composition has a loss tangent tan δ at 25° C. of 0.080 or less, measured under conditions of an initial tensile strain of 5%, a dynamic tensile strain of 1%, and a frequency of 52 Hz.

3. The tire according to claim 1, wherein the rubber component of an unvulcanized rubber composition before vulcanization of the vulcanized rubber composition comprises 20% by mass or more of the amine-modified butadiene rubber.

4. The tire according to claim 1, wherein the vulcanized rubber composition comprises carbon black, and the content of the carbon black in the unvulcanized rubber composition before vulcanization of the vulcanized rubber composition is 30 to 100 parts by mass based on 100 parts by mass of the rubber component.

5. The tire according to claim 1, wherein the unvulcanized rubber composition before vulcanization of the vulcanized rubber composition comprises 2.6 to 5.5 parts by mass of a thiuram based vulcanization accelerating agent based on 100 parts by mass of the rubber component.

6. The tire according to claim 5, wherein the unvulcanized rubber composition before vulcanization of the vulcanized rubber composition comprises a vulcanizing agent, and the mass ratio of the thiuram based vulcanization accelerating agent to the content of a sulfur in the vulcanizing agent (the content of the thiuram based vulcanization accelerating agent/the content of the sulfur in the vulcanizing agent) is 0.4 to 1.2.

7. The tire according to claim 5, wherein the unvulcanized rubber composition before vulcanization of the vulcanized rubber composition further comprises a vulcanization accelerating agent A other than the thiuram based vulcanization accelerating agent and comprises 1.0 to 5.0 parts by mass of the vulcanization accelerating agent A based on 100 parts by mass of the rubber component.

8. The tire according to claim 4, wherein the carbon black has a nitrogen adsorption specific surface area of 20 to 90 m$^2$/g.

9. The tire according to claim 1, wherein the unvulcanized rubber composition before vulcanization of the vulcanized rubber composition contains no softener or contains 4.0 parts by mass or less of the softener based on 100 parts by mass of the rubber component.

10. The tire according to claim 1, wherein the unvulcanized rubber composition before vulcanization of the vulcanized rubber composition contains no thermosetting resin or contains 1.0 part by mass or less of the thermosetting resin based on 100 parts by mass of the rubber component.

11. The tire according to claim 2, wherein the rubber component of an unvulcanized rubber composition before vulcanization of the vulcanized rubber composition comprises 20% by mass or more of the amine-modified butadiene rubber.

12. The tire according to claim 2, wherein the vulcanized rubber composition comprises carbon black, and the content of the carbon black in the unvulcanized rubber composition before vulcanization of the vulcanized rubber composition is 30 to 100 parts by mass based on 100 parts by mass of the rubber component.

13. The tire according to claim 2, wherein the unvulcanized rubber composition before vulcanization of the vulcanized rubber composition comprises 2.6 to 5.5 parts by mass of a thiuram based vulcanization accelerating agent based on 100 parts by mass of the rubber component.

14. The tire according to claim 3, wherein the vulcanized rubber composition comprises carbon black, and the content of the carbon black in the unvulcanized rubber composition before vulcanization of the vulcanized rubber composition is 30 to 100 parts by mass based on 100 parts by mass of the rubber component.

15. The tire according to claim 3, wherein the unvulcanized rubber composition before vulcanization of the vulcanized rubber composition comprises 2.6 to 5.5 parts by mass of a thiuram based vulcanization accelerating agent based on 100 parts by mass of the rubber component.

16. The tire according to claim 4, wherein the unvulcanized rubber composition before vulcanization of the vulcanized rubber composition comprises 2.6 to 5.5 parts by mass of a thiuram based vulcanization accelerating agent based on 100 parts by mass of the rubber component.

17. The tire according to claim 6, wherein the unvulcanized rubber composition before vulcanization of the vulcanized rubber composition further comprises a vulcanization accelerating agent A other than the thiuram based vulcanization accelerating agent and comprises 1.0 to 5.0 parts by mass of the vulcanization accelerating agent A based on 100 parts by mass of the rubber component.

18. The tire according to claim 2, wherein the unvulcanized rubber composition before vulcanization of the vulcanized rubber composition contains no softener or contains 4.0 parts by mass or less of the softener based on 100 parts by mass of the rubber component.

19. The tire according to claim 2, wherein the unvulcanized rubber composition before vulcanization of the vulcanized rubber composition contains no thermosetting resin or contains 1.0 part by mass or less of the thermosetting resin based on 100 parts by mass of the rubber component.

* * * * *